US007139758B1

(12) United States Patent
Laws et al.

(10) Patent No.: US 7,139,758 B1
(45) Date of Patent: Nov. 21, 2006

(54) METHOD AND SYSTEM FOR IMPROVED SECURITY TO CONTROL AND FACILITATE ACCESS TO DATA STORED IN A DATABASE

(75) Inventors: Robert Laws, Redmond, WA (US); Ted Dinklocker, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 388 days.

(21) Appl. No.: 10/308,713

(22) Filed: Dec. 2, 2002

(51) Int. Cl.
*G06F 7/00* (2006.01)
(52) U.S. Cl. ............................................ 707/9; 707/10
(58) Field of Classification Search .................... 707/9, 707/10; 713/202; 709/227
See application file for complete search history.

(56) References Cited

U.S. PATENT DOCUMENTS

| 5,884,312 | A  | * | 3/1999  | Dustan et al. ................. 707/10 |
| 5,987,422 | A  | * | 11/1999 | Buzsaki .......................... 705/9 |
| 6,052,785 | A  | * | 4/2000  | Lin et al. ........................ 726/5 |
| 6,076,108 | A  | * | 6/2000  | Courts et al. ................ 709/227 |
| 6,275,939 | B1 | * | 8/2001  | Garrison ..................... 713/200 |
| 6,286,104 | B1 | * | 9/2001  | Buhle et al. .................... 726/4 |
| 6,457,066 | B1 | * | 9/2002  | Mein et al. .................. 719/330 |
| 6,782,425 | B1 | * | 8/2004  | Germscheid et al. ....... 709/227 |
| 2002/0013711 | A1 | * | 1/2002  | Ahuja et al. .................... 705/1 |
| 2002/0055942 | A1 | * | 5/2002  | Reynolds .................... 707/200 |
| 2002/0073399 | A1 | * | 6/2002  | Golden ........................ 717/114 |
| 2002/0108057 | A1 | * | 8/2002  | Zhanhong Wu et al. .... 713/201 |
| 2003/0200465 | A1 | * | 10/2003 | Bhat et al. .................. 713/202 |

OTHER PUBLICATIONS

Ludds, "MySQL", Mar. 9, 2002, 2 pages printed from http://web.archive.org/web/20020608074602/http://www.ludd.luth.se/~mysql/ on Mar. 30, 2006.*
Descartes et al., "Programming the Perl DBI", Feb. 2000, 1st Edition, 16 Pages Printed from the O'reilly Online Catalog on Mar. 30, 2006.*
Thakkar, Meghraj, "Sams Teach Yourself Orcale8i On Windows NT in 24 Hours", 1999, Sams Publishing, pp. 152 and 282.*

* cited by examiner

*Primary Examiner*—Don Wong
*Assistant Examiner*—Michael Le
(74) *Attorney, Agent, or Firm*—Perkins Coie LLP (57) ABSTRACT

A project data service ("PDS") shields the database from direct client access by requiring all data requests made by a client to go through the PDS, thereby reducing the risk of losing or corrupting data and limiting inconsistencies caused by third-party add-on applications accessing data in the database. In order to access data stored in a database, a client typically must send a request through the PDS, which can determine if the client has access to the requested data. Then PDS typically retrieves the data from the database and passes the data to the client.

20 Claims, 11 Drawing Sheets

METHOD AND SYSTEM FOR IMPROVED SECURITY TO CONTROL AND FACILITATE ACCESS TO DATA STORED IN A DATABASE

FIELD OF THE INVENTION

The present invention relates to the field of project management. In particular, the present invention supports secure access to data, such as project management data, in a database, thereby allowing certain clients to view the data in the database, while restricting the ability of other clients to modify, remove, and add data.

BACKGROUND OF THE INVENTION

The occurrence of low unemployment rates coupled with high levels of business growth in the late 1990's forced companies in all industries to do more work with fewer resources. The need to properly understand and efficiently allocate project tasks to available resources led to increased usage of project management applications. Prior project management applications were designed to operate in a desktop environment. While prior project management applications had the ability to access centrally located databases, the application's primary design called for stand-alone operations, where a single project manager could monitor only his projects and his resources from his desktop computer. A need arose for a project management application designed for enterprise access, whereby any project manager within an enterprise could place a project plan and the resources to be used on a central database so that other project managers and enterprise managers could view projects on an enterprise global basis.

Clients routinely access application programs containing sensitive data. The application programs can comprise project management applications having project scheduling data, resource scheduling data, and resource experience data. The application programs can operate on a desktop computer, with data limited to the data available in a desktop system. Alternatively, the application programs can operate on an enterprise-wide level, with data available from the enterprise system through a central database.

For example, a large organization can have multiple projects in progress at any one point in time. Each project can use multiple resources to achieve the goals of the project. Examples of resources can include employee labor, machinery, and facilities. When a project manager begins a new project, the project manager typically wants to know the current allocation of resources to determine which resources have the time and experience necessary to accomplish the project manager's project. If the project manager accesses the desktop version of the project management application, the project manager typically can only view his own projects and how he has currently allocated resources. The project manager typically cannot view other projects within the same enterprise or how all the resources in the enterprise are allocated among all the projects in the enterprise.

If the project manager accesses the enterprise version of the project management application, the project manager can typically view not only his projects but also projects managed by other project managers. The project manager also can typically view how resources throughout the enterprise are allocated amongst the projects. Having an enterprise view of the project and resource allocation allows a project manager to make a more educated decision on when his project can be completed, what the best resources are for his project, and what resources are available for his project throughout the enterprise.

Prior project management applications either allowed an application user direct access to information stored in the database or required the input of a connection string before access to the database was allowed. Allowing direct access to the database placed the stored data at risk of being lost or modified by any person with access to the system. Requiring the application user to supply a connection string before viewing the database provided improved security of the data in the database. However, management applications requiring a connection string were still prone to being hacked, thereby allowing unfettered access to the database and placing the stored data at risk. A need arose for a project management application with an improved security architecture to control and facilitate access to enterprise project data stored in the database.

Furthermore, third-party application providers can now create specific add-on applications for the project management application which extend the overall functionality of the project management application. However, the inconsistencies of each third-party application's access methods to the data in the database of the project management application can reduce the overall effectiveness of the project management application and place the stored data in the database at risk. Providing a standard access method for add-on applications can increase overall effectiveness of the project management application, reduce the risk of losing the stored data, and provide incentive to third-party add-on application providers to build upon the current architecture of the project management application.

SUMMARY OF THE INVENTION

A project data service (PDS) shields the database from direct client access by requiring data requests made by a client to go through the PDS, thereby reducing the risk of losing or corrupting data and limiting inconsistencies caused by third-party add-on applications accessing data in the database. In order to access data stored in a database, a client typically must send a request through the PDS, which can determine if the client has access to the requested data. Based on authorized access, the PDS typically retrieves the data from the database and passes the data to the client.

The inventive methods and system disclosed herein provide a means for improved security to control and facilitate access to project management data stored in a database. Thus, one aspect of the present invention is to require a client, wishing to access project management data in the database, to send all requests for the data in the database through a middle-tier component. The middle-tier component can then determine the type and range of project management data the client is permitted to access from the database, record that the client is accessing the data, retrieve the data from the database, and send the data to the requesting client.

The middle-tier component typically comprises a PDS. The PDS is typically implemented by a middle-tier, data access, internet server application programming interface component object model. The PDS can receive requests for data from a variety of clients using a multitude of applications. The applications used to make requests on the PDS typically include web access programs, project management applications and third-party applications. Third-party applications are typically add-on applications to the project management application and attempt to improve the functionality or scalability of the project management application. Requests can be made on the PDS using a multitude of protocols, including hypertext transfer protocol and simple object access protocol. Furthermore, the PDS can receive multiple method requests from the client. While many of the method requests relate to accessing project data, methods relating to system administration and client access are also recognized and operated on by the PDS.

When a client requests access to a file, the method request typically includes the client identification and the identity of the file requested. The client can also provide a database identification number in connection with the request. The database identification number signals to the PDS where the requested file is located, including the server and the database in which the file resides. The database identification number typically takes the form of a structured query language process identification (SPID). The PDS accepts the information provided by the request and compares it to information stored in the database to determine if the client has permission to access the requested file or method. If the client has permission to access the requested file or method, the PDS stores information related to the client in the database. The information stored in the database typically includes the client identification, the client password, the database identification number, and the file or method requested. Once the information is stored, the PDS typically accesses the database, retrieves the requested file, and sends the file to the client in response to the request.

BRIEF DESCRIPTION OF DRAWINGS

For a more complete understanding of the present invention and the advantages thereof, reference is now made to the following description in conjunction with the accompanying drawings in which.

DETAILED DESCRIPTION OF THE EXEMPLARY EMBODIMENTS

Figure 1:
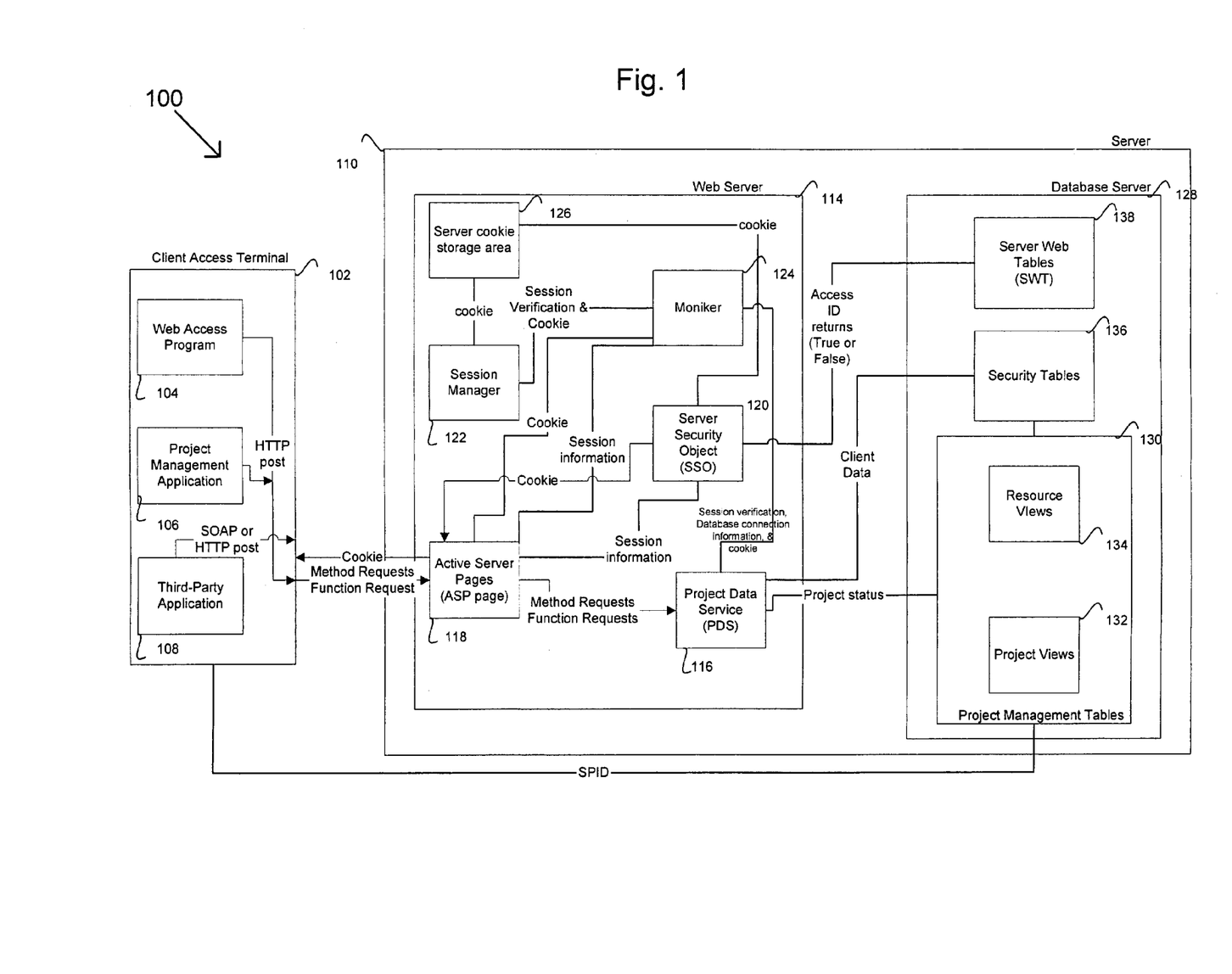
FIG. 1 is a block diagram of a project management system constructed in accordance with an exemplary embodiment of the present invention.

The present invention supports a computer-implemented method for providing a secure access to a database and can be more readily understood by reference to system 100 of FIG. 1. FIG. 1 is a block diagram illustrating a project management computer system 100 constructed in accordance with an exemplary embodiment of the present invention. The exemplary project management system 100 comprises a client access terminal 102 including a web access program 104, a project management application 106, or a third-party application 108, and a server 110 including a web server 114 and a database 128. The web server 114 comprises a PDS 116, active server pages 118, a server security object 120, a session manager 122, a moniker 124, and a server cookie storage area 126. The database 128 comprises project management tables 130, server web tables 138, security tables 136, resource views 134, and project views 132.

The client access terminal 102 is communicably attached via a computer network to the server 110. The client access terminal 102 typically provides a client with a means for communicating with the server 110, web server 114, the active server pages (ASP pages) 118, the server security object (SSO) 120, and project management tables 130. For example, the client access terminal 102 can transmit information to the ASP pages 118, including method requests, function requests, cookies, and SQL process identifications (SPID). The client access terminal 102 can receive information from the project management tables 130, including a SPID associated with the database 128. The client access terminal 102 can also receive information from the server security object 120, such as a cookie.

The web access program 104 is typically stored in a memory storage area of the client access terminal 102 and can communicate with the server 110 using a selected communication protocol. In one exemplary embodiment, the web access program 104 communicates with the server 110 using a hypertext transfer protocol (HTTP). The web access program 104 can be implemented by an application which enables a user to access the internet via a client access terminal 102 such as the INTERNET EXPLORER or NETSCAPE browser programs.

The project management application 106 is typically stored in a memory storage area of the client access terminal 102. The project management application 106 can communicate with the server 110 using a selected communication protocol. In one exemplary embodiment, the project management application 106 communicates with the server 110 using the HTTP protocol.

The third-party application 108 is typically stored in a memory storage area of the client access terminal 102. In one exemplary embodiment, the third-party application 108 is an add-on application to the project management application 106 which can extend or enhance the capabilities of the project management application 106. The third party application 108 can communicate with the server 110 using a selected communication protocol, such as the HTTP protocol or the simple object access protocol (SOAP).

The server 110 is communicably attached via a computer network to the client access terminal 102. The server 110 typically represents a computer or program that responds to commands from a client through a client access terminal 102.

The web server 114 is communicably attached via a computer network to the client access terminal 102 and the database 128. The web server 114 typically comprises active server page and component object model (COM) components including, but not limited to the PDS 116, active server page 118, a server security object 120, a session manager 122, a moniker 124, and a server cookie storage area 126.

The PDS 116 is communicably attached via a computer network to the ASP page 118, the moniker 124, the security tables 136, the server web tables 138, and the project management tables 130. The PDS 116 receives method and function requests from the ASP page 118. The PDS 116 also receives a session verification, a database connection information and a cookie from the moniker 124. The PDS 116 transmits and receives information related to a file's status from the project management tables 130 and a client's data from the security tables 136 in the database 128. The PDS 116 typically represents a middle-tier data access internet server application programming interface dynamic link library COM component for data. The PDS 116 typically acts as a security layer between the client and the data in the database 128, requiring the client to access the data through the PDS 116.

The ASP page 118 is communicably attached via a computer network to the client access terminal 102, PDS 116, server security object 120, and moniker 124. The ASP page 118 typically represents active server pages comprising text files having text, HTML tags, and commands written in a scripting language. The ASP page 118 can complete script commands, generate an HTML document and send the document to the client at the client access terminal 102.

The server security object (SSO) 120 is communicably attached via a computer network to the client access terminal 102, the ASP page 118, the server cookie storage area 126, and the server web tables 138. The SSO 120 typically comprises a COM component in the web server 114.

The session manager 122 is communicably attached via a computer network to the moniker 124, and the server cookie storage area 126. The session manager 122 typically manages sessions on the web server 114, stores configuration information, and provides remote administration support. The session manager 122 can comprise a COM component in the web server 114.

The moniker 124 is communicably attached via a computer network to the PDS 116, the ASP page 118, and the session manager 122. The moniker 124 typically comprises a COM object that refers to a specific instance of another object in the web server 114.

The server cookie storage area 126 is communicably attached via a computer network to the session manager 122. The server cookie storage area 126 typically receives a request for and transmits a cookie to the SSO 120 and the session manager 122. The server cookie storage area 126 can be implemented by a memory storage area from which cookies are retrieved in the web server 114.

The database 128 is communicably attached via a computer network to the server 110, the web server 114, and the client access terminal 102. The database 128 typically comprises the project management tables 130, the security tables 136, and the server web tables 138. In one exemplary embodiment, the database 128 is a structured query language database server.

The project management tables 130 are communicably attached via a computer network to the PDS 116, the security tables 136, and the client access terminal 102. The project management tables 130 can comprise multiple data tables, including project views 132 and resource views 134. In one exemplary embodiment, the project views 132 and resource views 134 contain database files in both read-only and read/write versions. In another exemplary embodiment, the project views 132 are database files comprising data on projects occurring within an enterprise or corporation. The resource views 134 typically comprise database files on the resources within the enterprise or corporation. For example, resources can include employees, contractors, machinery, and floor space.

The security tables 136 are communicably attached via a computer network to the PDS 116. The security tables 136 typically comprise multiple tables containing data fields including, but not limited to a project ID, a resource ID, a SPID, and flags for determining whether the client is granted read-only access or read/write access. In one exemplary embodiment, the security tables 136 comprise a project security table and a resource security table.

The server web tables 138 are communicably attached via a computer network to the SSO 120. The server web tables 138 comprise web tables typically containing client access identification (ID) information including, but not limited to the client name, the client password, and a plurality of files and versions the client is permitted to access.

Figure 2:
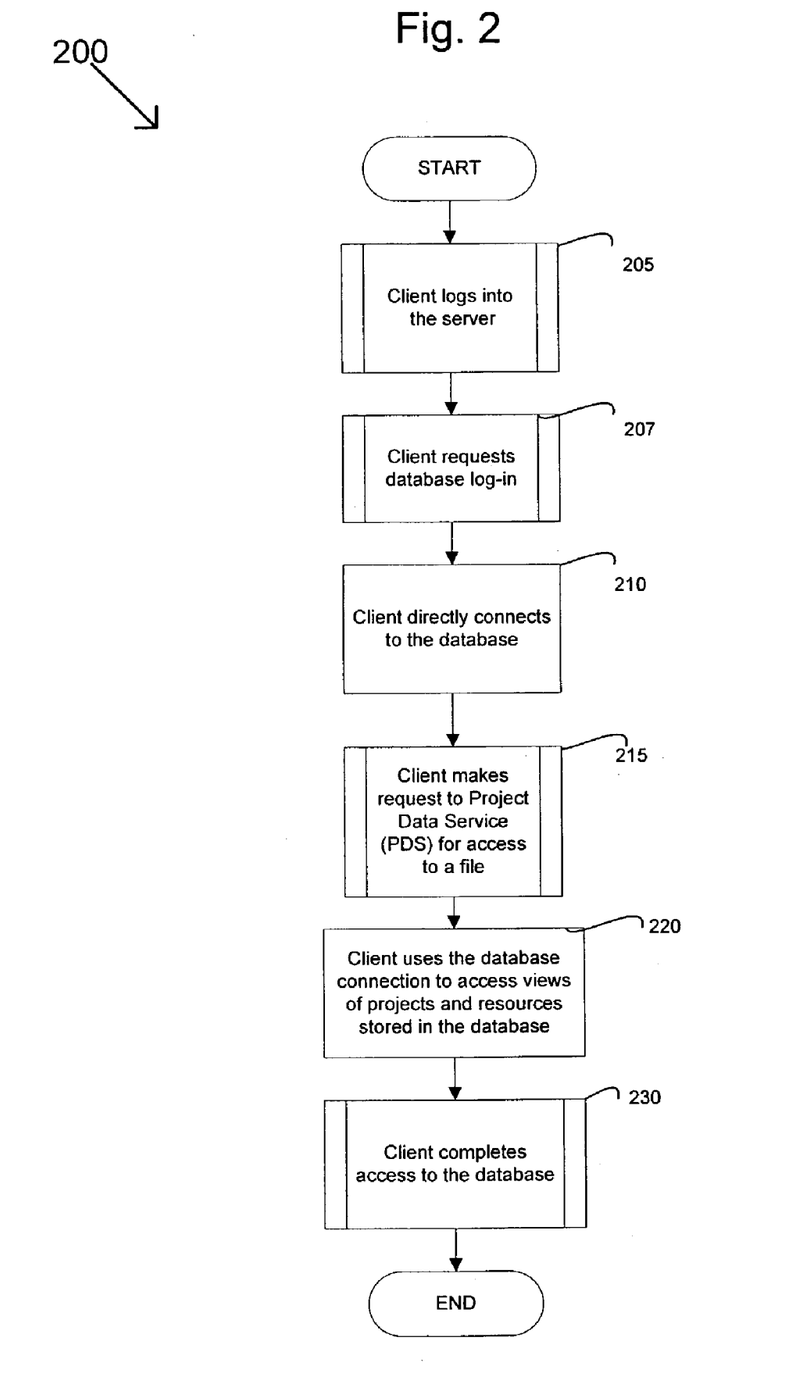
FIG. 2 is a flow chart illustrating a process for improved security to control and facilitate access to data stored in a database in accordance with an exemplary embodiment of the present invention.

FIGS. 2–11 are logical flowchart diagrams illustrating the computer-implemented processes completed by an exemplary method for controlling access to data stored in a database. FIG. 2 is a logical flow chart diagram 200 presented to illustrate the general steps of an exemplary process for controlling access to data stored in a database within the operating environment of the exemplary project management system 100 of FIG. 1.

Now referring to FIGS. 1 and 2, the exemplary method 200 begins at the START step and proceeds to step 205, in which a client logs into the server 110 from the client access terminal 102. The client access terminal 102, which typically represents a point from which the client can access the server 110, comprises the project management application 106, the web access program 104, or the third party application 108. Both the web access program 104 and the project management application 106 typically access the server 110 through an HTTP post method of communication. In contrast, the third party application 108 can typically access the server 110 through either an HTTP post method of communication or a SOAP protocol method of communication.

In step 207, the client requests database log-in from the client access terminal 102 to the server 110. In step 210, the client directly connects to the database 128 from a client access terminal 102. Direct connection to the database 128 is made by the client to gather a database identification number. The database identification number signals to the PDS 116 which database connection the client will utilize to access the requested file. The database identification number typically takes the form of a structured query language process identification (SPID). The database 128 can be one of numerous databases communicably attached to the server 110 or residing within the server 110. In step 215, the client makes a request to the PDS 116 for access to a file via the client access terminal 102. The file typically represents a project file or a resource file stored in the project management tables 130 of the database 128.

In step 220, the client uses the database connection, achieved in step 215, to access files, such as the resource views 134 and project views 132, based on access granted by the PDS 116. The resource views 134 and project views 132 are typically implemented by both read only and read/write files and are stored in the project management tables 130 of the database 128. In step 230, the client completes access to the project management tables 130 via use of the client access terminal 102. The method 200 then terminates at the END step.

Figure 3:
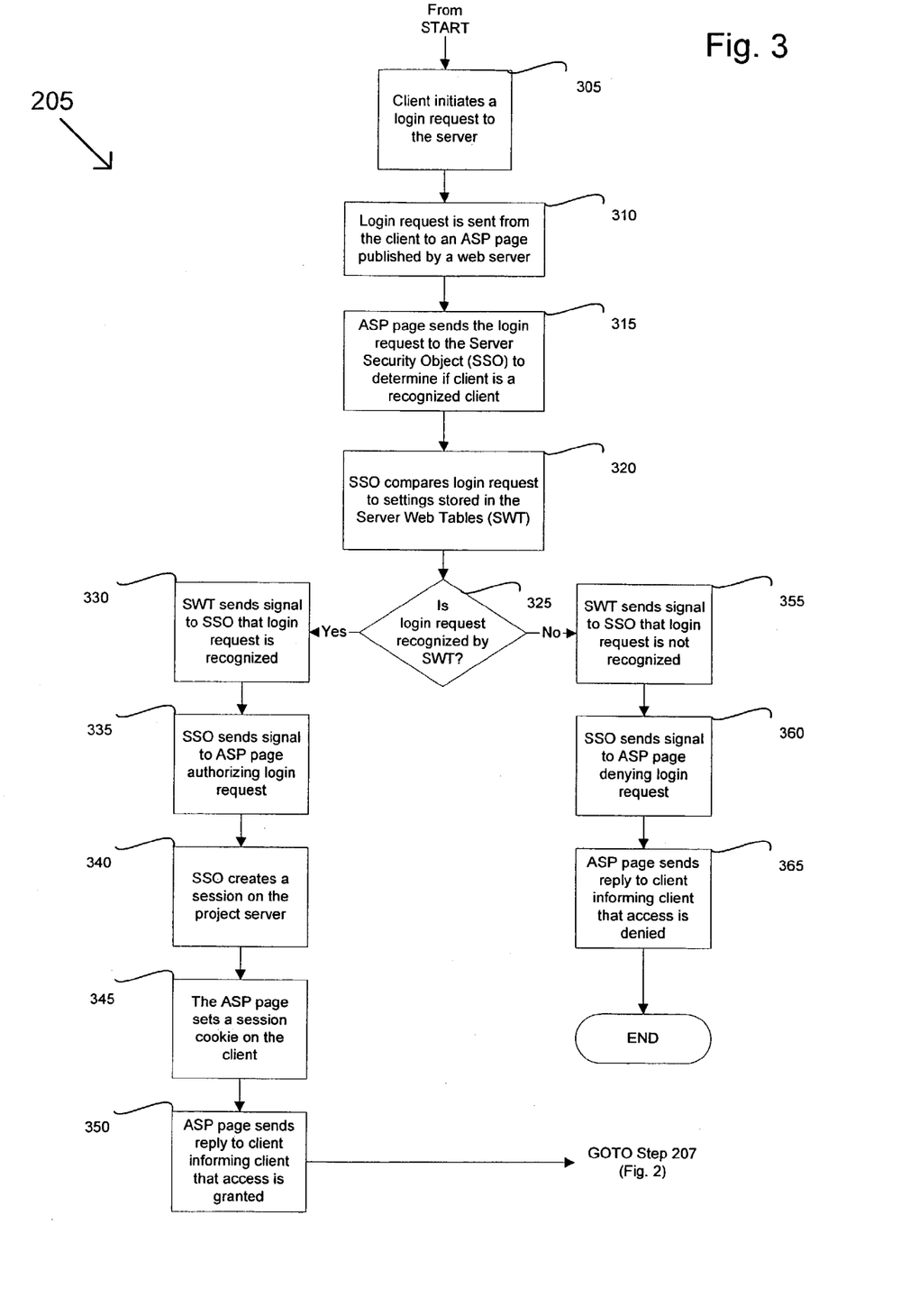
FIG. 3 is a flow chart illustrating a process for a client logging onto a server in accordance with an exemplary embodiment of the present invention.

FIG. 3 is a logical flowchart diagram illustrating an exemplary computer-implemented method for a client logging into the server 110 as completed by step 205 of FIG. 2. Referencing FIGS. 1, 2, and 3, the method 205 is initiated with the client making a log-in request to the server 110, in step 305 from a client access terminal 102. The client typically logs into the server 110 by passing a set of data, such as a username and password, from the client access terminal 102 to the server 110. In step 310, the log-in request made by the client in step 305 is sent from the client access terminal 102 to the ASP page 118.

In step 315, the ASP page 118 sends the log-in request to the server security object 120. The server security object 120 typically represents a COM component of the web server 114 housed in the server 110. The ASP page 118 typically sends the log-in request to the server security object 120 to determine if the client is recognized by the server 110. To determine if the client is recognized by the server 110, the server security object 120 compares the log-in request to data stored in the server web tables 138 in step 320. In one exemplary embodiment, the data stored in the server web tables 138 includes a client name and a list of files the client has permission to access.

In step 325, an inquiry is conducted to determine if the log-in request received by the server security object 120 is recognized by the server web tables 138. If so, the "YES" branch is followed to step 330. Otherwise, the "NO" branch is followed to step 355. Based on the determination by the server security object 120 that the log-in request is recognized, the server web tables 138 send a signal to the SSO 120 that the log-in request is recognized in step 330. In step 335, the SSO 120 sends a signal to the ASP page 118 authorizing the log-in request. The SSO 120 creates a session on the server 110 in step 340. The creation of the session can be implemented by providing the client with a method for interacting with the server 110 for more than log-in purposes, such as requesting and modifying data stored in the database 128. In step 345, the ASP page 118 places a cookie on the client access terminal 102. In one exemplary embodiment, the cookie represents a text file placed on the client access terminal 102. The cookie typically serves as an identification card unique to the client. The cookie can be retrieved by the SSO 120 from the server cookie storage area 126 and then sent to the client access terminal 102 through the ASP page 118. In step 350, the ASP page 118 sends a reply to the client at the client access terminal 102 informing the client that access to the server is granted. The method 205 then proceeds to step 207, where the client requests an opportunity to log-in to the database 110.

Based on the determination by the server security object 120 that the log-in request is not recognized, the server web tables 138 typically sends a signal to the SSO 120 that the log-in request is not recognized in step 355. A log-in request is typically not recognized when the information provided in the log-in request does not match any of the data stored in the server web tables 138. In step 360, the SSO 120 sends a signal to the ASP page 118 denying the client's log-in request. The ASP page 118 sends a reply to the client access terminal 102 informing the client that access to the server 110 is denied in step 365. When access to the server 110 is denied, the client typically can not retrieve any additional information or further interact with the server 110. If the client is denied access to the server 110, the method 205 then terminates at the END step.

Figure 4:
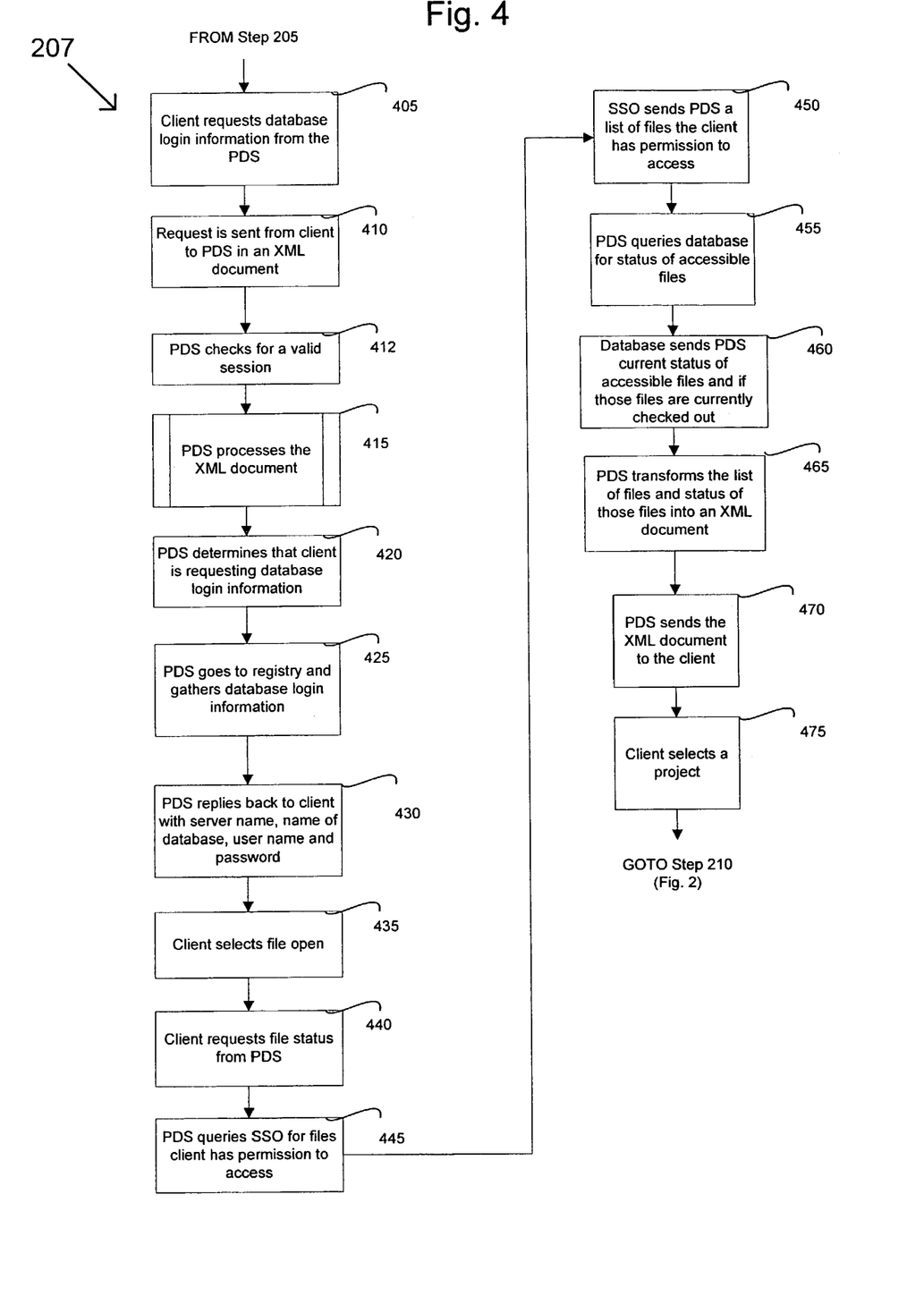
FIG. 4 is a flow chart illustrating a process for a client requesting database log-in information in accordance with an exemplary embodiment of the present invention.

FIG. 4 is a logical flowchart diagram illustrating an exemplary computer-implemented method for a client requesting database log-in information as completed by step 207 of FIG. 2. Referencing FIGS. 1, 2, and 4, the method 207 is initiated with the client making a request for database log-in information in step 405. In step 410, the request of step 405 can be sent from the client access terminal 102 through the ASP page 118 to the PDS 116. The request is typically sent in the form of a computer-readable language, such as an XML document.

In step 412, the PDS 116 sends a signal to the SSO 120 to determine if a session was created on the server 110, as completed by step 340 of FIG. 3. In step 415, the PDS 116 processes the request for database log-in information. The processing step 415 can be implemented by parsing the request into functional parts, determining a method requested, and executing the method requested. In step 420, the PDS 116 determines that the client is requesting database log-in information. The PDS 116 goes to the registry of the operating system for the server 110 and gathers the database login information in step 425. For example, the database log-in information can comprise the server name, name of the database, the client name, and the client password. The PDS 116 sends the database log-in information to the client at the client access terminal 102 in step 430.

In step 435, the client makes a request to the PDS 116 to open a file in the project management tables 130 from the client access terminal 102. The client access terminal 102 sends the request through the ASP page 118 to the PDS 116 for a file status in step 440. The file status request can comprise the list of files the client has access to, the status of the accessible files and a determination if the files are currently checked-out such as when the file is opened by another client prior to the request and the other client is still viewing the file when the request is made. In step 445, the PDS 116 queries the SSO 120 to determine the files the client has permission to access. In step 450, the SSO 120 sends the PDS 116 a list of files the client has permission to access.

In step 455, the PDS 116 queries the database 128 to determine the status of files the client has permission to access. In the status query the PDS 116 attempts to determine if the files are checked-out. In step 460, the database 128 sends the PDS 116 the status of the files the client has permission to access, as well as if those files are currently checked-out. In step 465, the PDS 116 transforms the list of files into a computer-readable format, such as an XML document. The PDS 116 sends the computer-readable format of the list of files through the ASP page 118 to the client access terminal 102 in step 470. In step 475, the client selects a file, at the client access terminal 102, from the list of files the client has permission to access. The method 207 then proceeds to step 210.

Figure 5:
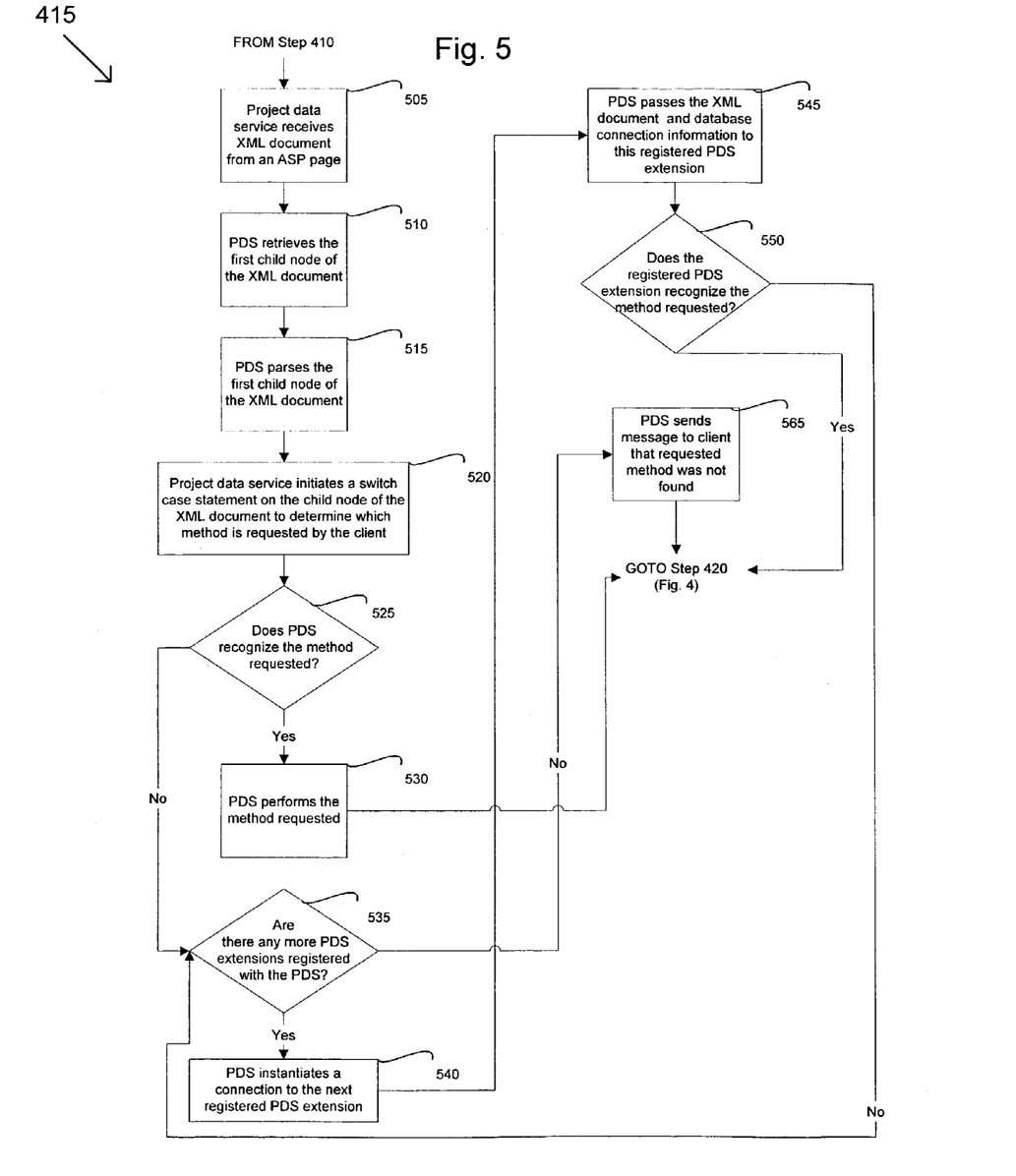
FIG. 5 is a flow chart illustrating a process for processing an XML document in accordance with an exemplary embodiment of the present invention.

FIG. 5 is a logical flowchart diagram illustrating an exemplary computer-implemented method for processing an XML document in the PDS 116 as completed by step 415 of FIG. 4. Referencing FIGS. 1, 2, 4, and 5, the method 415 is initiated with the PDS 116 receiving an XML document from an ASP page 118 in step 505. In step 510, the PDS 116 receives a first child node from the XML document. In step 515, the PDS 116 parses the first child node from the parent node in the XML document, to get the data the PDS 116 requires. For example, an object model can be used to parse the first child node from the parent. The object model exposes the contents of an XML document and presents an easily processed standardized interpretation of the XML document to the PDS 116.

In step 520, the PDS 116 initiates a switch case statement on the child node of the XML document parsed in step 515. The switch case statement tests an expression, the child node, against a range of possible matches to methods stored in the PDS 116. The switch case statement of step 520 can allow for a determination of the method requested by the client in the XML document. In step 525, an inquiry is conducted to determine if the PDS 116 recognizes the method requested. If so, the "YES" branch is followed to step 530, where the PDS 116 performs the method requested. The methods that can be requested by a client comprise: project status, project access, project access completed, projects check-out, projects check-in, project delete, project version, version, version create, version delete, version update, resource status, resource access, resource access completed, resource check-out, resource check-in, resource new, resource deactivate, resource activate, resource account modify, resource check, PDS info, update resource availability and cube, check OLAP cube, project view table create, resource view table create, scheduling context, project security table clean, resource security table clean, project clean, permission check, administrative settings, get log-in information, and get initialization data. The process continues to step 420 (FIG. 4).

If the PDS 116 does not recognize the method requested, the "NO" branch is followed to step 535. In step 535, an inquiry is conducted to determine if one of numerous PDS extensions is registered with the PDS 116. The PDS extensions are methods created by a third-party to customize the functionality of the project management system. The PDS extension is typically a COM component stored in the web server 114. If the PDS extension is not registered with the PDS 116, the "NO" branch is followed to step 565, where the PDS 116 sends a message to the client, informing the client that the method requested was not found. The process continues to step 420 (FIG. 4).

If the PDS extension is registered with the PDS 116, the "YES" branch is followed to step 540, where the PDS 116 makes a connection to one of numerous PDS extensions. In step 545, the PDS 116 passes the XML document and the database connection information to the PDS extension. In step 550, an inquiry is conducted to determine if the one of the plurality of PDS extensions recognizes the method requested. If so, the "YES" branch is followed to step 420 (FIG. 4). If not, the "NO" branch is followed and the process returns to step 535 to determine if another PDS extension is registered with the PDS 116.

Figure 6:
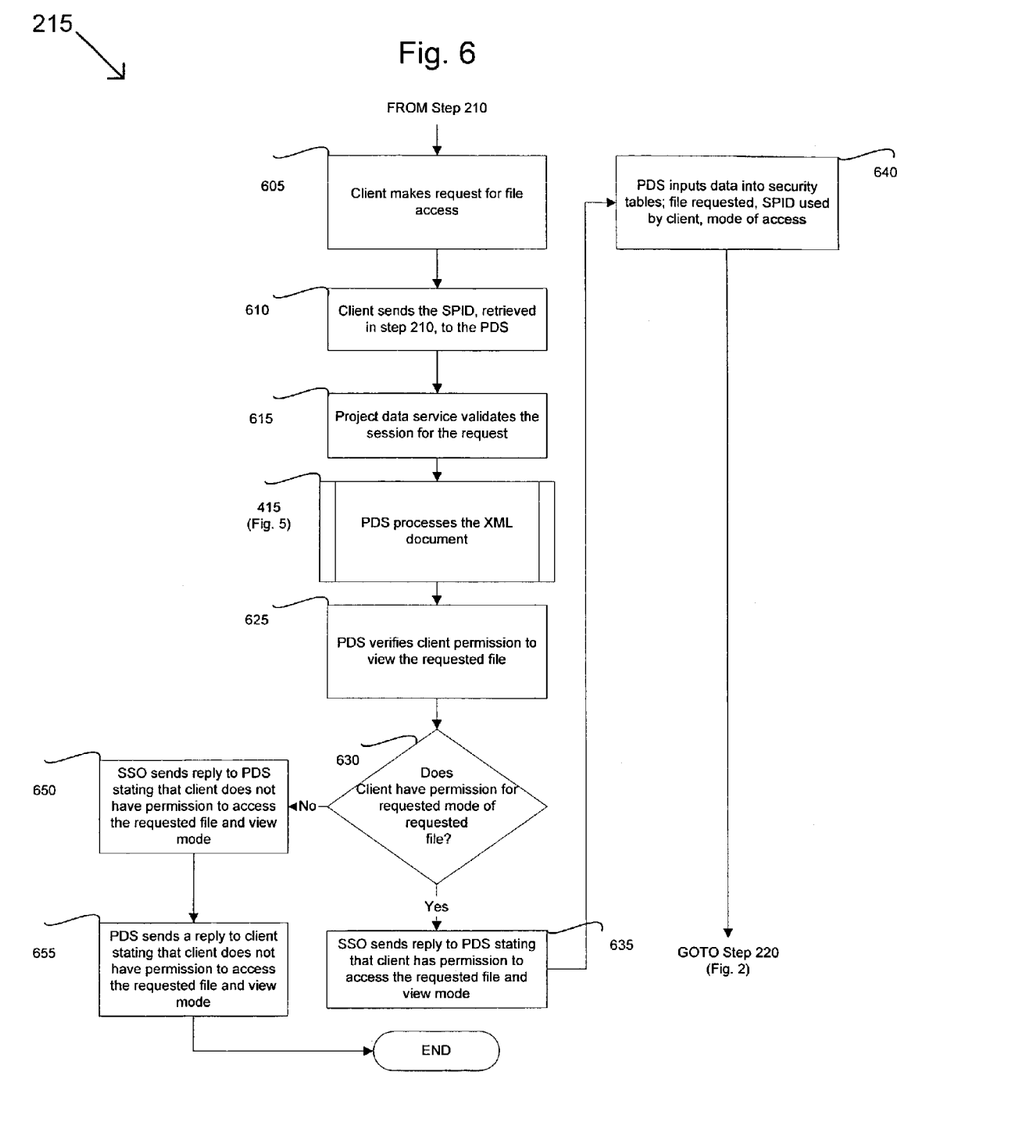
FIG. 6 is a flow chart illustrating a process for requesting access to a file in the database through a PDS in accordance with an exemplary embodiment of the present invention.

FIG. 6 is a logical flowchart diagram illustrating an exemplary computer-implemented method for requesting access to a file through the PDS 116 as completed by step 215 of FIG. 2. Referencing FIGS. 1, 2, and 6, the method 215 is initiated with the client requesting access to a file in step 605 via a client access terminal 102. In step 610, the client sends the SPID, retrieved in step 210 of FIG. 2, to the PDS 116. In step 615, the PDS 116 validates the session for the method requested. To validate the session, the PDS 116 typically sends a signal to the moniker 124 to determine if a valid session was created on the server 110 as completed by step 340 of FIG. 3.

In step 415, the PDS 116 processes the request and determines that the client is requesting access to a file. A request to access a file can comprise the name of the file, the version of the file and view mode of the file. The view mode of the file can be either read only or read/write. In step 625, the PDS 116 queries the SSO 120 to verify that the client has permission to access the file requested. Verification can be implemented by determining if the client has permission to access the requested view mode of the requested version of the requested file.

In step 630, an inquiry is conducted to determine if the client has permission to access the requested view mode of the requested version of the requested file. The inquiry is typically conducted by the PDS 116 analyzing information stored in the SSO 120. If the client does not have permission, the "NO" branch is followed to step 650, where the SSO 120 sends a reply to the PDS 116 stating that the client does not have permission to access the requested view of the requested version of the requested file. The PDS 116 sends a reply to the client, at the client access terminal 102, that the client does not have permission to access the requested view of the requested version of the requested file in step 655. The process continues to the END step.

If the client does have permission, the "YES" branch is followed to step 635, where the SSO 120 sends a reply to the PDS 116 stating that the client has permission to access the requested view of the requested version of the requested file. In step 640, the PDS 116 inputs data into the security tables 136 comprising the view mode, the version, the file, the SPID used by the client, and a mode of access. The mode of access can be the type of access requested by the client access terminal 102 used by the client to access the server 110. The process continues to step 220 (FIG. 2).

Figure 7:
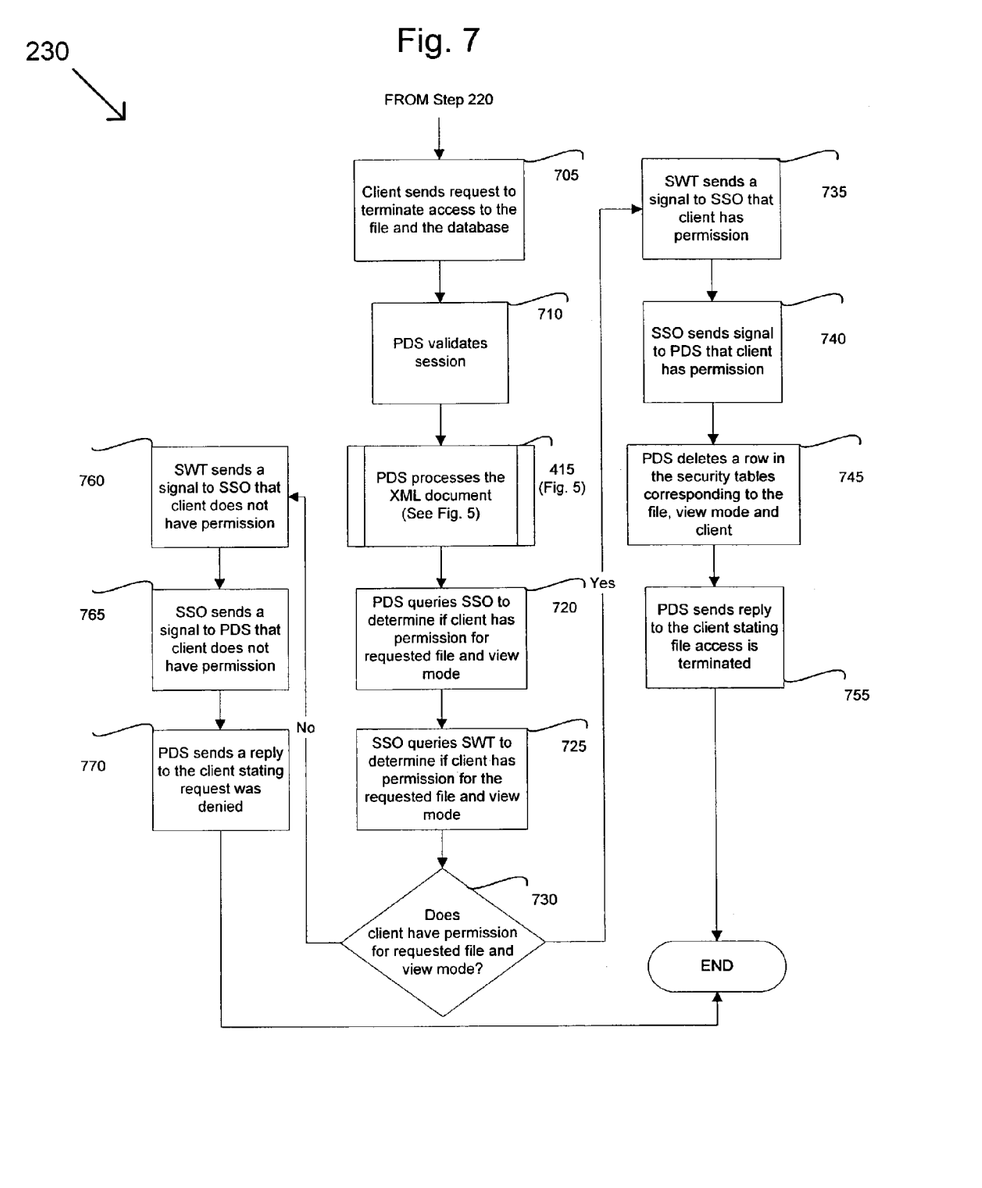
FIG. 7 is a flow chart illustrating a process for requesting termination of access to a file and exiting the database in accordance with an exemplary embodiment of the present invention.

FIG. 7 is a logical flowchart diagram illustrating an exemplary computer-implemented method for requesting termination of access to the file and exiting the database through the PDS 116 as completed by step 230 of FIG. 2. Referring to FIGS. 1, 2, and 7, the method 230 is initiated with the client sending a request to terminate access to the file in step 705 from the client access terminal 102. In step 710, the PDS 116 validates the session. In step 415, the PDS 116 processes the request and determines that the client is requesting termination of access to the file and the database.

In step 720, the PDS 116 queries the SSO 120 to verify that the client has permission to terminate access to the file requested. The verification typically comprises determining if the client has permission to terminate access to the requested view of the version of the file. In step 725, the SSO 120 queries the server web tables 138 to verify that the client has permission to terminate access to the requested view of the version of the file by comparing the file requested to data stored in the server web tables 138 relating to files the client has permission to access. In step 730, an inquiry is conducted to determine if the client has permission to terminate access to the requested view of the version of the file. If not, the "NO" branch is followed to step 760, where the server web tables 138 send a signal to the SSO 120 that the client does not have permission to terminate access to the view of the version of the file requested. For example, if a client had not earlier requested access to the file, the client would not be granted permission to terminate access. The SSO 120 sends a signal to the PDS 116 that the client does not have permission to terminate access to the view of the version of the file requested in step 765. In step 770, the PDS 116 sends a reply to the client that the request was denied. The process continues to the END step.

If the client does have permission to terminate access to the file, the "YES" branch is followed to step 735. In step 735, the server web tables 138 send a signal to the SSO 120 that the client does have permission to terminate access to the view of the version of the file requested. The SSO 120 sends a signal to the PDS 116 that the client does have permission to terminate access to the view of the version of the file requested in step 740. In step 745, the PDS 116 deletes the row of data in the security tables 136 that was stored in the security tables 136 in step 640 of FIG. 6. In step 755, the PDS 116 sends a reply to the client that access to the file and the database has been terminated. The reply is sent from the PDS 116 through the ASP page 118, to the client access terminal 102. The process continues to the END step.

Figure 8:
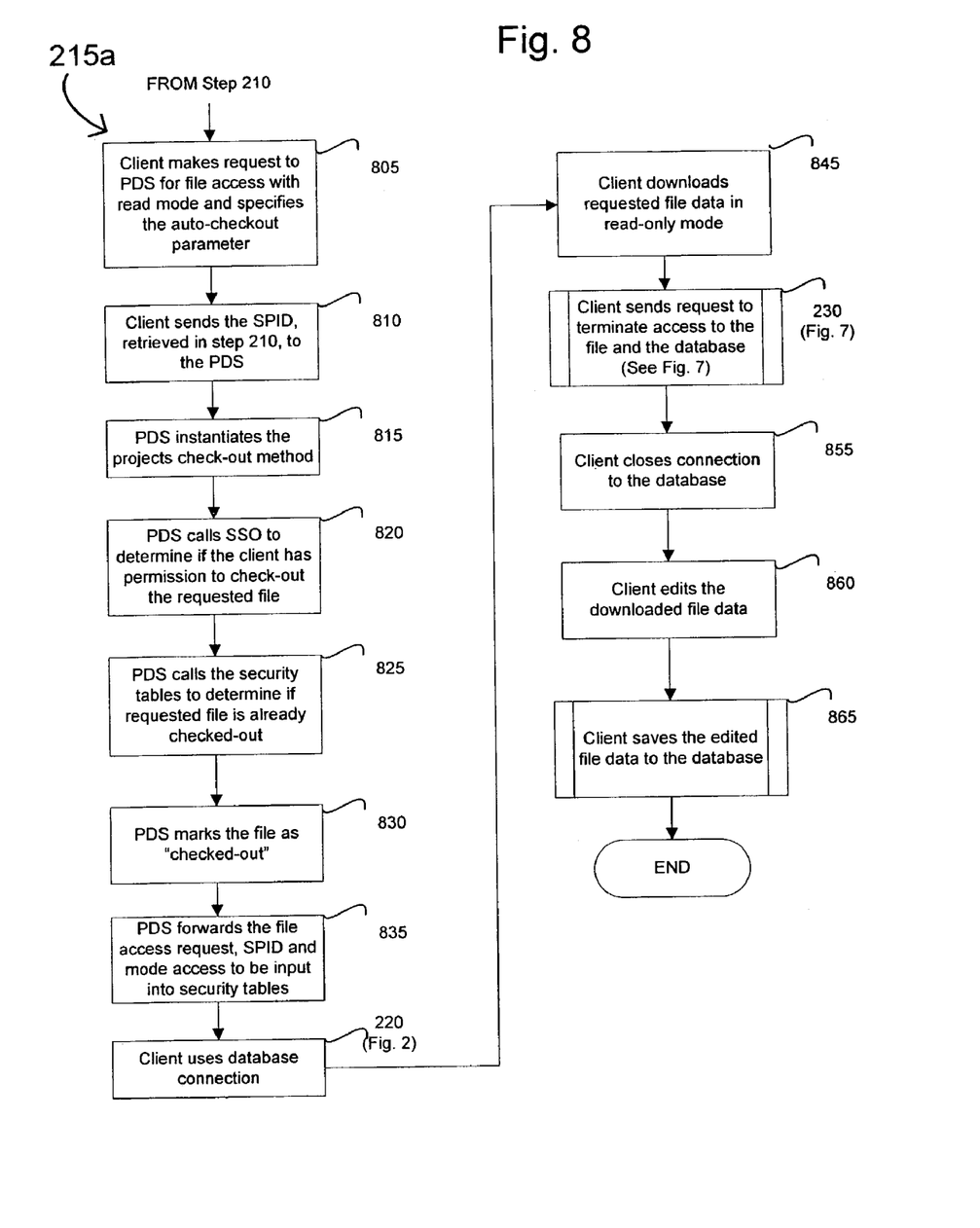
FIG. 8 is a flow chart illustrating a process for editing data in the database through the PDS in accordance with an alternate exemplary embodiment of the present invention.

FIG. 8 is a logical flowchart diagram illustrating an alternative exemplary computer-implemented method for editing data in the database 128 through the PDS 116. Now referencing FIGS. 1, 2, and 8, the method 215a is initiated by first completing steps 205, 207 and 210. In step 805, the client makes a request for access to the file. The request comprises a request for access to the file in read-only mode and specifies the auto-check-out parameter and is sent from the client access terminal 102 through the ASP page 118 to the PDS 116. The client sends the SPID, retrieved in step 210 of FIG. 2, to the PDS 116 in step 810. The SPID travels from the client access terminal 102, through the ASP page 118 to the PDS 116. In step 815, the PDS instantiates the project check-out method. In step 820, the PDS 116 verifies that the client has permission to check-out the requested view of the version of the file. Permission is typically verified by the PDS 116 sending the request to the SSO 120. The SSO 120 compares the request received from the PDS 116 to data stored in the server web tables 138.

In step 825, the PDS 116 determines if the requested view of the version of the file is already checked-out. The PDS 116 typically checks the project management tables 130 to see if the file is checked-out. In step 830, the PDS 116 marks the requested view of the version of the file as checked-out in the project management tables 130. The PDS 116 sends data to be stored in the security tables 136 in step 835. In one exemplary embodiment, the data stored in the security table comprises the view, the version, the file, the SPID sent by the client, and the mode of access.

In step 220, the client connects to the database 128 and accesses the requested file from the project management tables 130. The client downloads the requested file into the local memory of the client access terminal 102. The file downloaded is typically a read-only view of the file. In one exemplary embodiment the read-only view of the file is downloaded from either the project views 132 or the resource views 134 of the project management tables 130. In step 230, the client sends a request to terminate access to the file and the database 128. The request is typically sent from the client access terminal 102 through the ASP page 118 to the PDS 116. In step 855, the client closes the connection to the database 128. In step 860, the client edits the file downloaded in step 845. In step 865, the client saves the edited file to the project management tables 130 of the database 128. The process continues to the END step.

Figure 9:
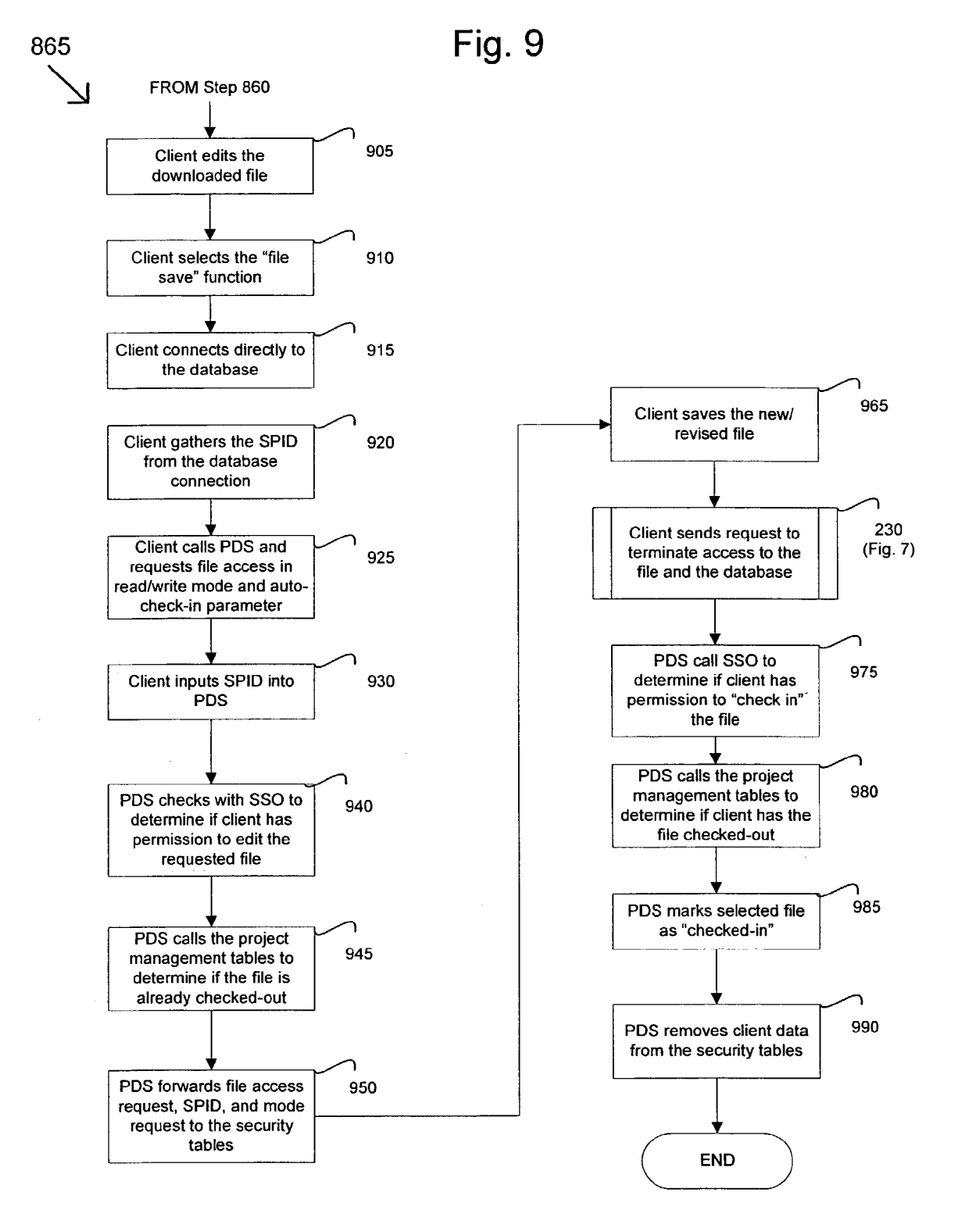
FIG. 9 is a flow chart illustrating a process for saving edited files to the database through the PDS in accordance with an exemplary embodiment of the present invention.

FIG. 9 is a logical flowchart diagram illustrating an exemplary computer-implemented method 865 for saving edited files to the database 128 through the use of the PDS 116. Now referencing FIGS. 1, 2, 8, and 9, the method 865 is initiated with the client editing the downloaded file in step 905. In step 910, the client selects the "file save" function at the client access terminal 102. The "file save" function is typically located in a drop-down menu on the client access terminal 102. In step 915, the client connects directly to the database 128. The direct connection can run from the client access terminal 102 to the database 128. In step 920, the client gathers the SPID. The SPID is typically retrieved from the project management tables 130 in the database 128. In step 925, the client makes a request for file access. The request is typically sent from the client access terminal 1021 through the ASP page 118 to the PDS 116. The request comprises a request for access to a file in read/write view and a request for an auto-check-in parameter. The auto-check-in parameter typically marks the file in the database 128 as checked-in.

In step 930, the client sends the SPID to the PDS 116. The client typically inputs the SPID retrieved in step 920 into the client access terminal 102. The SPID is then sent from the client access terminal 102 through the ASP page 118 to the PDS 116. The PDS 116 determines if the client has permission to edit the requested file in step 940. To determine if the client has permission, the PDS 116 sends the data received from the client to the SSO 120. The SSO 120 can query the server web tables 138 to determine if the client has permission. Then, the SSO 120 sends a signal back to the PDS 116 with a determination of the client's permission to edit the requested file. In step 945, the PDS 116 determines if the requested file is checked-out. The determination typically occurs with the PDS 116 querying the database 128 to see if the requested file is marked as checked-out. The PDS 116 typically queries the project management tables 130 to determine if the requested file is checked-out.

In step 950, the PDS 116 inputs data into the security tables 136 including the view, the version, the file, the SPID used by the client, and a mode of access. The process continues to step 965, where the client saves the file. The client typically sends the file from the client access terminal 102 to the project views 132 which transfer the data through to the project management tables 130 where the file is stored. The saved file can represent either a new file or an edited file previously stored in the database 128. The saved file is typically stored in the project views 132 or the resource views 134. In step 230, the client sends a request to terminate access to the file and the database 128.

In step 975, the PDS 116 determines if the client has permission to check-in the requested file. To determine if the client has permission, the PDS 116 sends the data received from the client to the SSO 120. The SSO 120 can query the server web tables 138 to determine if the client has permission. Then, the SSO 120 sends a signal back to the PDS 116 with a determination of the client's permission to check-in the requested file. The PDS 116 determines if the client checked-out the requested file in step 980. Typically, the PDS 116 queries the project mangement tables 130 to determine if a particular client checked-out the requested file. In step 985, the PDS 116 marks the requested file as checked-in. To mark the requested file as checked-in, the PDS 116 sends a signal to the security tables 136. In one exemplary embodiment, the signal sent from the PDS 116 to the security tables 136 comprises the name of the file, the client's access information and the request to mark the file as checked-in. In step 990, the PDS 116 deletes the row of data in the security tables 136 that was stored in the security tables 136 in step 940. The process then continues to the END step.

Figure 10:
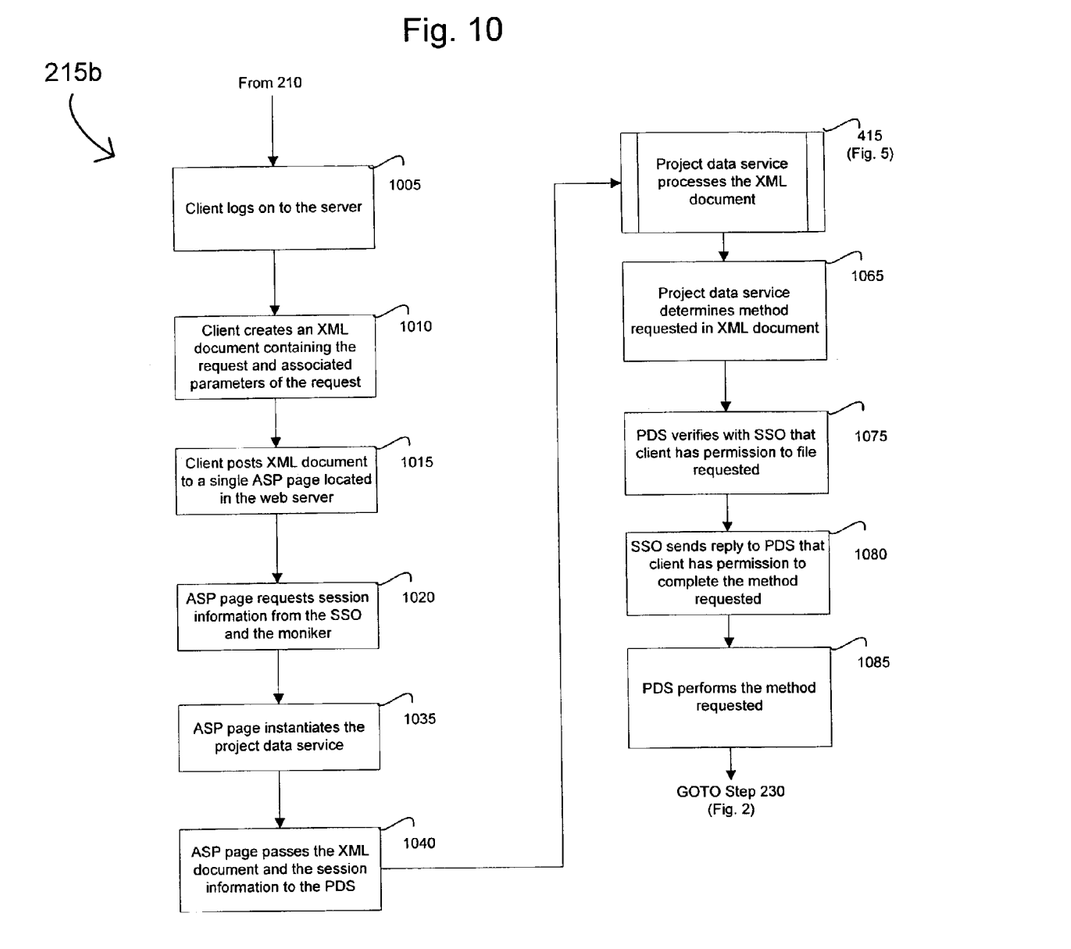
FIG. 10 is a flow chart illustrating a process for accessing the PDS using a hyper text transfer protocol in accordance with an alternate exemplary embodiment of the present invention.

FIG. 10 is a logical flowchart diagram illustrating an alternative exemplary computer-implemented method 215b for accessing the PDS 116 through a client access terminal 102 using a hyper text transfer protocol (HTTP) to send requests to the server 110. Now referring to FIGS. 1, 2, 5, and 10, the method 215b for accessing the PDS 116 through a client access terminal 102 using a hyper text transfer protocol, begins at the START step and proceeds to step 1005, where the client logs on to the server 110. In step 1010, the client makes a method request. The method request is comprised of an XML document containing the method requested and any associated parameters of the method request. For example, if the client makes a request for access to a file, the XML document would contain the request for access to the file. Furthermore, the XML document would typically contain the name of the file and the version of the file requested. In step 1015, the client sends the method request to the web server 114. The method request is typically sent using HTTP from the client access terminal 102 to the ASP page 118 located in the web server 114.

In step 1020 the ASP page 118 requests session information from the SSO 120 and the moniker 124. The ASP page 118 instantiates the PDS 116 in step 1035. In step 1040, the ASP page 118 sends the method request, received in step 1015, and the session information, received in step 1020, to the PDS 116. The PDS 116 processes the method request in step 415 of FIG. 5. In step 1065, the PDS 116 determines the method the client requested in the method request. In step 1075, the PDS 116 verifies that the client has permission to access the data associated with the method requested. Verification is typically accomplished with the PDS 116 instantiating an instance of the SSO 120. The PDS 116 sends the session information to the SSO 120. The SSO 120 will typically compare the session information to data stored in the server web tables 138. In step 1080, the SSO 120 sends a reply back to the PDS 116 that the client has permission to complete the method requested. The PDS 116 performs the method requested in step 1085. Then the process continues to step 220 of FIG. 2.

Figure 11:
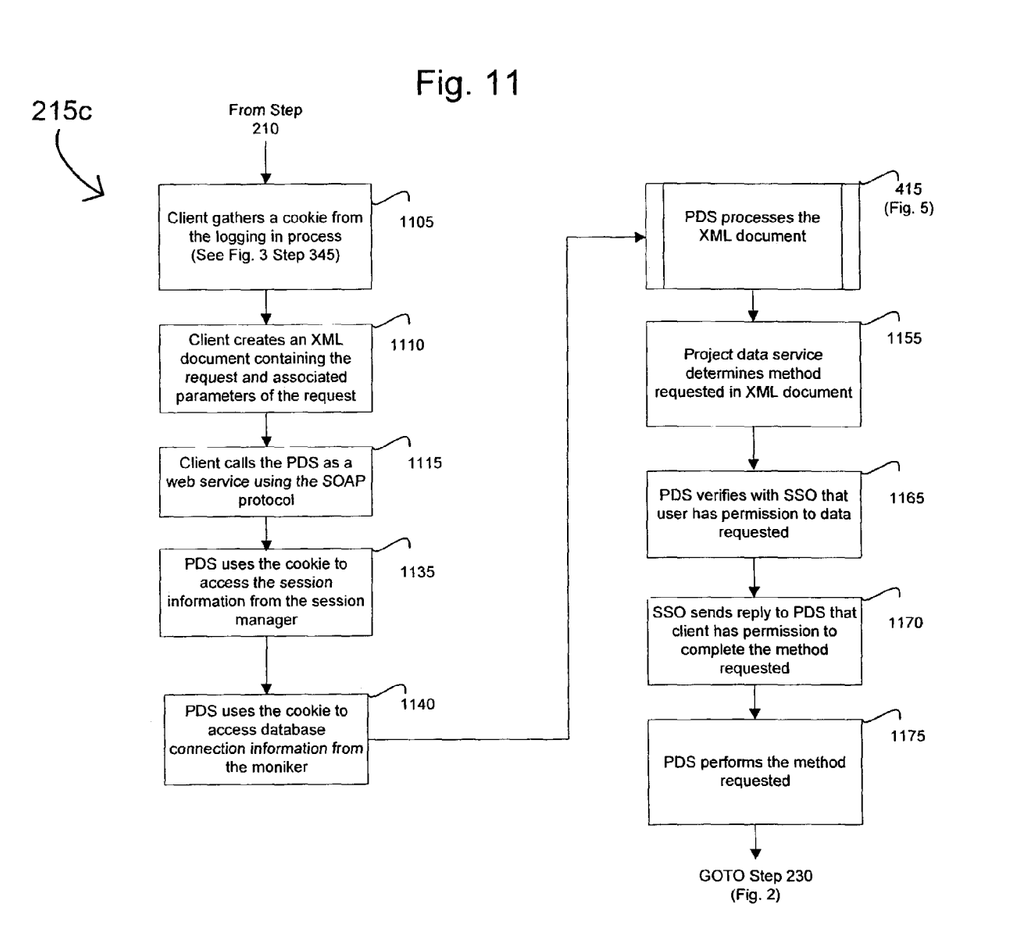
FIG. 11 is a flow chart illustrating a process for accessing the PDS using a simple object access protocol in accordance with an alternate exemplary embodiment of the present invention.

FIG. 11 is a logical flowchart diagram illustrating an alternative exemplary computer-implemented method 215c for accessing the PDS 116 through a client access terminal 102 using a simple object access protocol (SOAP) to send requests to the server 110. Now referring to FIGS. 1, 2, 5, and 11, the method 215c for accessing the PDS 116 from a client access terminal 102 using a SOAP protocol, begins at step 1105, where the client gathers the cookie retrieved from the logging in process of step 205 (FIG. 2). In step 1110, the client creates a method request. In step 1115, the client sends the method request and the cookie from the client access terminal 102 to the PDS 116 through a web service. In one exemplary embodiment, the method request is sent in the form of an XML document from a third-party application 108 through an ASP page 118 to the PDS 116, using the SOAP protocol.

The PDS 116 uses the cookie to access session information from the session manager 122 in step 1135. In step 1140, the PDS 116 uses the cookie to access database connection information from the moniker 124. Database connection information can include the server name, the name of the database, the user name, and the password for the database. In step 415 of FIG. 5, the PDS 116 processes the method request. The PDS 116 determines the method the client requested in the method request in step 1155. In step 1165, the PDS 116 verifies that the client has permission to access the data associated with the method requested. Verification is typically accomplished with the PDS 116 instantiating an instance on the SSO 120. The PDS 116 sends the session information to the SSO 120. The SSO 120 will typically compare the session information to data stored in the server web tables 138. In step 1170, the SSO 120 sends a reply back to the PDS 116 that the client has permission to complete the method requested. The PDS 116 performs the method requested in step 1175. Then the process continues to step 220 of FIG. 2.

It is considered that the operations, steps, and procedures described above and illustrated in the accompanying drawings are sufficiently disclosed to enable one of ordinary skill in the art to practice the present invention. However, there are many computers, operating systems, and application programs which may be used in practicing an exemplary embodiment of the present invention. Each user of a particular computer will be aware of the language and tools which are most useful for that user's needs and purposes. In addition, although the invention was described in the context of a project management application, those skilled in the art will appreciate that the invention can be extended to a wide variety of business management applications. It should be understood that the foregoing related only to specific embodiments of the present invention, and that numerous changes may be made therein without departing from the spirit and scope of the invention as defined by the following claims.

We claim:

1. A method in a client system for accessing project data stored by a database system, the method comprising:
   sending from the client system to a web server system a first request to log on to the web server system;
   after receiving a reply to the first request indicating that the client successfully logged onto the web server system,
      directly connecting from the client system to the database system; and
      in response to directly connecting to the database system, receiving from the database system database connection identifier of a database connection through which the client system is to access the database system;
   sending from the client system to the web server system a first request to access project data of the database, the first request including the database connection identifier, wherein when the client system is authorized to access the requested project data, the web server system updates the database system to indicate that the access via the database connection identifier to the project data is authorized; and
   upon receiving a reply from the web server system indicating that the access to the project data is authorized via the database connection, sending from the client system directly to the database system via the database connection a second request to access project data of the database, wherein the database system allows the requested access based on the web server system update to the database that specifies the database connection identifier.

2. The method of claim 1 wherein the database connection identifier is a structured query language process identifier.

3. The method of claim 1 wherein the database system includes security tables and project views and the web server system updates the security tables to indicate that the access via the database connection identified by the database connection identifier to the project data through project views is authorized.

4. The method of claim 1 wherein the database system includes server tables that specify authorization for client systems.

5. The method of claim 1 wherein the web server system accesses an access control list for tables of the project data to determine whether a client system is authorized to access a table.

6. The method of claim 1 wherein the request to access project data of the database system includes a record identifier of a project.

7. The method of claim 1 wherein the database system denies the requested access when the web server system has not updated the database system to specify the database connection identifier.

8. A web server system comprising at least a central processing unit, the web server system for controlling access to project data stored by a database system, comprising:
- a component that receives from a client system a request to access project data of the database system, the request including a database connection identifier of a database connection established directly between the client system and the database system;
- a component that determines whether the client system is authorized to access the requested project data;
- a component that updates the database system to indicate that access via the database connection identified by the database connection identifier to the requested project data is authorized; and
- a component that sends to the client system a reply indicating that the access to the project data is authorized.

9. The system of claim 8 including a component that receives from the client system a request to log on to the web server system and that determines whether the client system is authorized to log on to the web server system.

10. The system of claim 8 wherein the database connection identifier is a structured query language process identifier.

11. The system of claim 8 wherein the database system includes security tables and project views and wherein the component that updates the database system updates the security tables to indicate that access via the database connection identified by the database connection identifier to the project data through project views is authorized.

12. The system of claim 8 wherein the client system obtains the database connection identifier by establishing a direct connection with the database system.

13. The system of claim 8 wherein the database system includes server tables that specify authorization for client systems.

14. The system of claim 8 wherein the component that updates the database system accesses an access control list for tables of the project data to determine whether the client system is authorized to access a table.

15. The system of claim 8 wherein the database system denies access of the client system when the database system has not been updated to specify the database connection identifier.

16. A method in a database system for controlling access to project data, the method comprising:
- receiving from a client system a request to establish a direct connection with the database system;
- sending to the client system a database connection identifier that identifies a connection through which the client system is connected to the database system;
- receiving from a web server system an update to a security table that indicates that access to project data through the database connection identified by the database connection identifier is authorized;
- receiving directly from the client system via the database connection identified by the database connection identifier a request to access project data; and
- allowing the client system to access the project data when the security table contains the database connection identifier.

17. The method of claim 16 including denying the client system access to the project data when the security table does not contain the database connection identifier.

18. The method of claim 16 wherein the connection database identifier is a structured query language process identifier.

19. The method of claim 16 wherein the database system includes server tables that specify authorization for client systems.

20. The method of claim 16 wherein the database system includes an access control list for project data that specifies a client system is authorized to access the project data.

* * * * *